US012785448B2

(12) United States Patent
Jang

(10) Patent No.: US 12,785,448 B2
(45) Date of Patent: Nov. 3, 2026

(54) ANTENNA MODULE, WIRELESS POWER TRANSMISSION SYSTEM, AND CASE FOR PORTABLE TERMINAL

(71) Applicant: AMOSENSE CO., LTD., Cheonan-si (KR)

(72) Inventor: Kiljae Jang, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 679 days.

(21) Appl. No.: 18/275,874

(22) PCT Filed: Feb. 4, 2022

(86) PCT No.: PCT/KR2022/001769
§ 371 (c)(1),
(2) Date: Aug. 4, 2023

(87) PCT Pub. No.: WO2022/169306
PCT Pub. Date: Aug. 11, 2022

(65) Prior Publication Data
US 2024/0120772 A1 Apr. 11, 2024

(30) Foreign Application Priority Data
Feb. 5, 2021 (KR) ........................ 10-2021-0016424

(51) Int. Cl.
*H02J 50/10* (2016.01)
*H01F 7/02* (2006.01)
(Continued)

(52) U.S. Cl.
CPC ............ *H02J 50/10* (2016.02); *H01F 7/0231* (2013.01); *H01Q 1/248* (2013.01); *H02J 50/005* (2020.01); *H02J 50/70* (2016.02); *H02J 50/90* (2016.02)

(58) Field of Classification Search
CPC ........ H01F 27/02; H01F 27/366; H01F 38/14; H01F 7/0231; H01F 7/0247; H01Q 1/24;
(Continued)

(56) References Cited

U.S. PATENT DOCUMENTS

2012/0235636 A1* 9/2012 Partovi .................. H01F 38/14 320/108
2014/0091758 A1* 4/2014 Hidaka ................ H01F 27/366 320/108
(Continued)

FOREIGN PATENT DOCUMENTS

IN 211089831 U 7/2020
JP 2014-036116 A 2/2014
(Continued)

OTHER PUBLICATIONS

KR Office Action dated Apr. 6, 2023 as received in Application No. 10-2022-0014866.
(Continued)

*Primary Examiner* — Timothy J Thompson
*Assistant Examiner* — Rhadames Alonzo Miller
(74) *Attorney, Agent, or Firm* — Maschoff Brennan

(57) ABSTRACT

The present invention has a circular or arc-shaped magnet array disposed around a receiving coil and transmitting coil for wireless power transmission, thereby increasing the alignment accuracy of the receiving coil and transmitting coil, and preventing the deterioration of properties such as inductance, charging efficiency, etc.

14 Claims, 13 Drawing Sheets

(51) Int. Cl.

| | |
|---|---|
| ***H01Q 1/24*** | (2006.01) |
| ***H02J 50/00*** | (2016.01) |
| ***H02J 50/70*** | (2016.01) |
| ***H02J 50/90*** | (2016.01) |

(58) Field of Classification Search
CPC .......... H01Q 1/243; H01Q 1/248; H01Q 1/38; H01Q 1/52; H01Q 7/00; H01Q 7/06; H02J 50/005; H02J 50/10; H02J 50/12; H02J 50/402; H02J 50/70; H02J 50/90
See application file for complete search history.

(56) References Cited

U.S. PATENT DOCUMENTS

| | | | | |
|---|---|---|---|---|
| 2019/0044391 | A1* | 2/2019 | Jang ........................ | H01F 38/14 |
| 2019/0386389 | A1 | 12/2019 | Ichikawa | |
| 2021/0328628 | A1 | 10/2021 | Baek et al. | |

FOREIGN PATENT DOCUMENTS

| | | | |
|---|---|---|---|
| KR | 10-2015-0117082 | A | 10/2015 |
| KR | 10-2017-0010868 | A | 2/2017 |
| KR | 10-2019-0069365 | A | 6/2019 |
| KR | 10-2020-0026140 | A | 3/2020 |
| WO | 2010/129369 | A2 | 11/2010 |

OTHER PUBLICATIONS

KR Office Action dated Jun. 27, 2023 as received in Application No. 10-2022-0014866.

* cited by examiner

[FIG. 1]
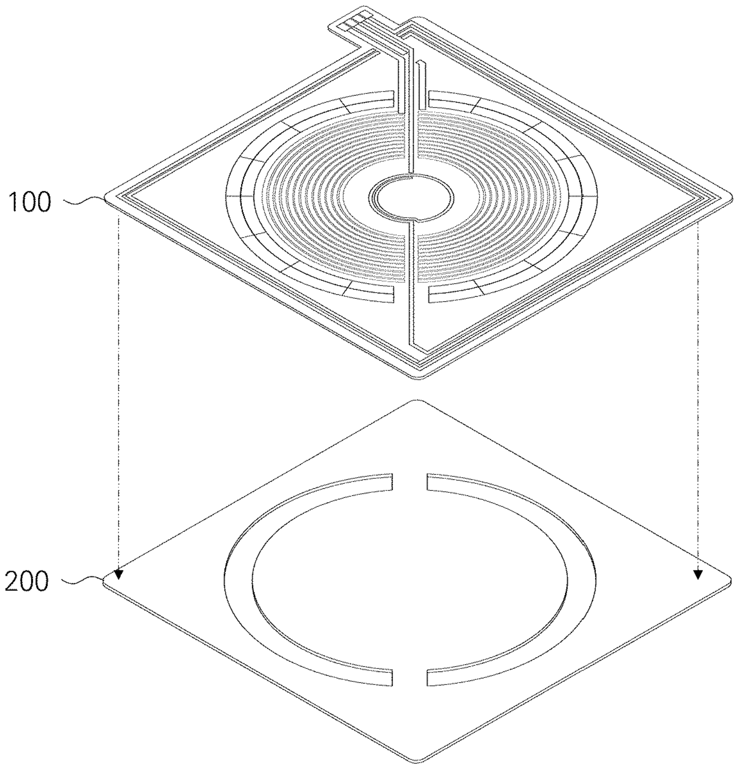

[FIG. 2]
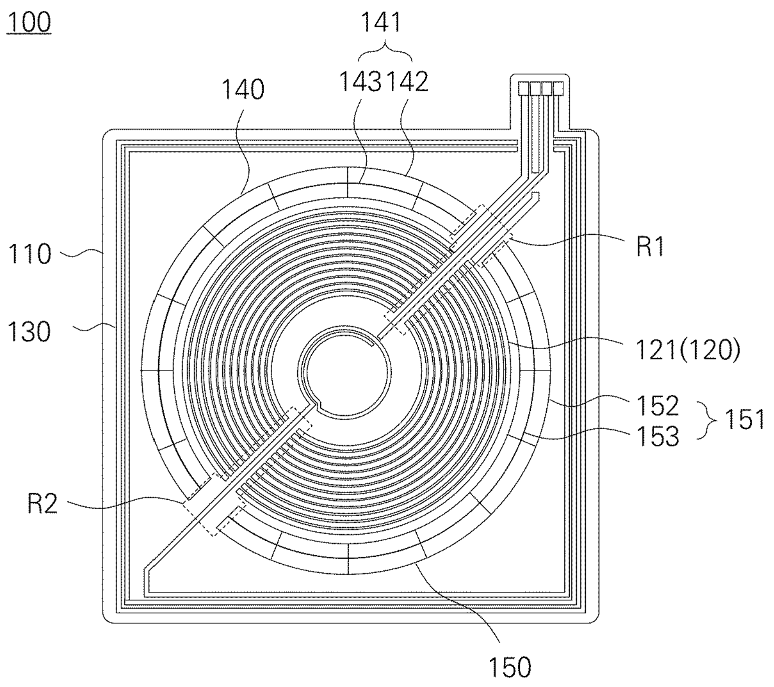
[FIG. 3]
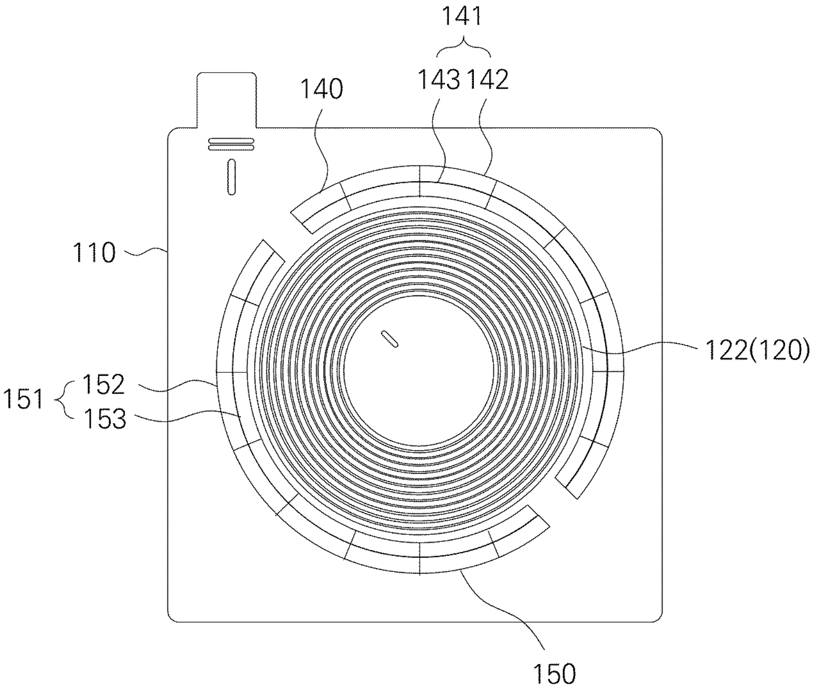

[FIG. 4]
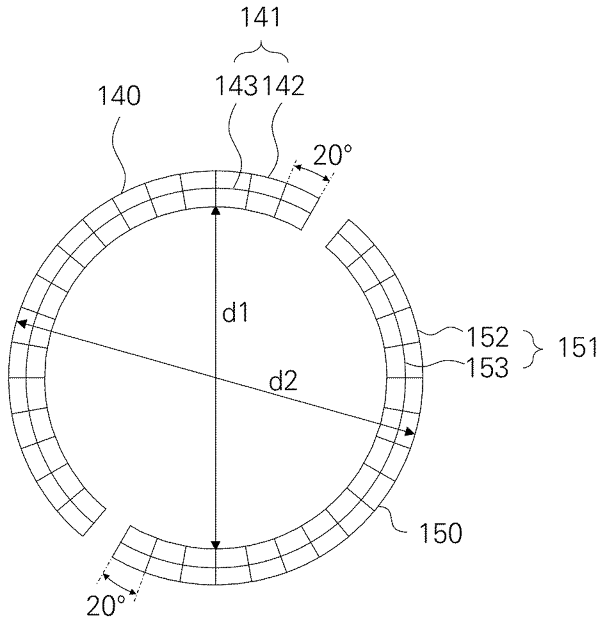
[FIG. 5]
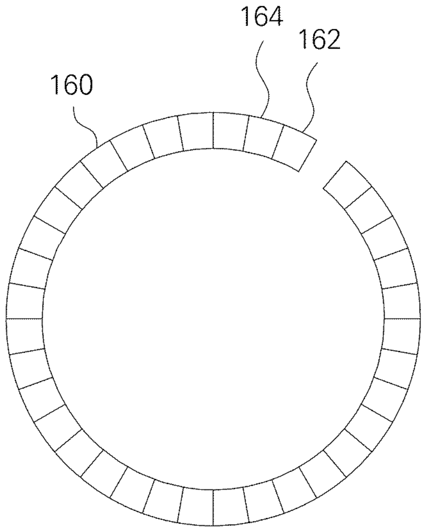

[FIG. 6]
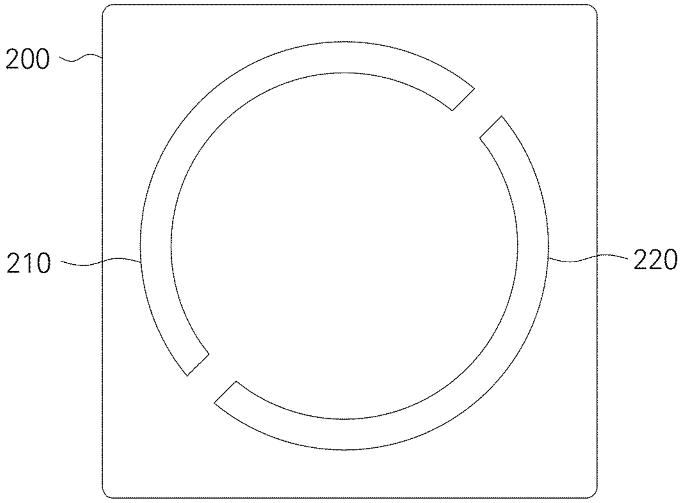

[FIG. 7]
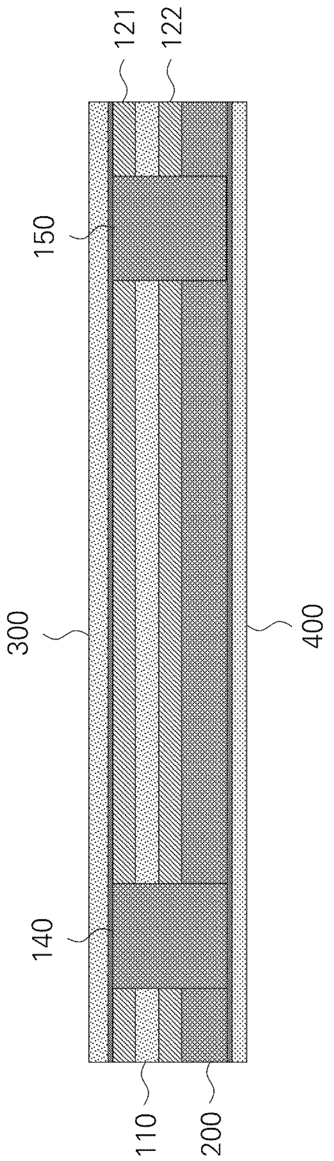

[FIG. 8]
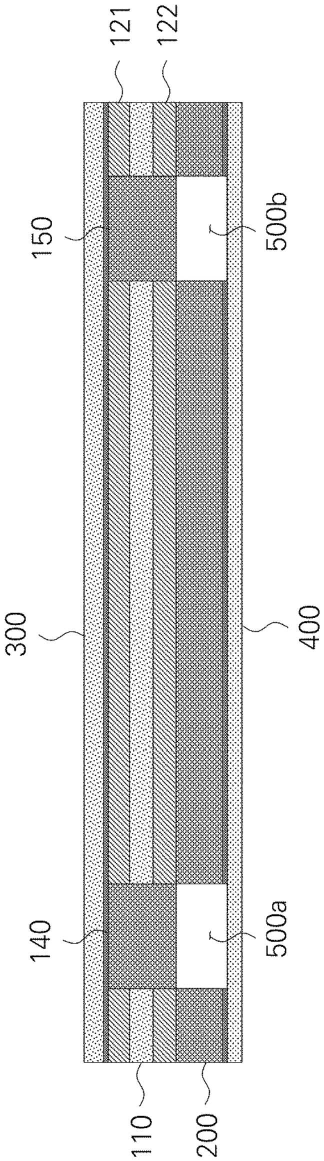

[FIG. 9]
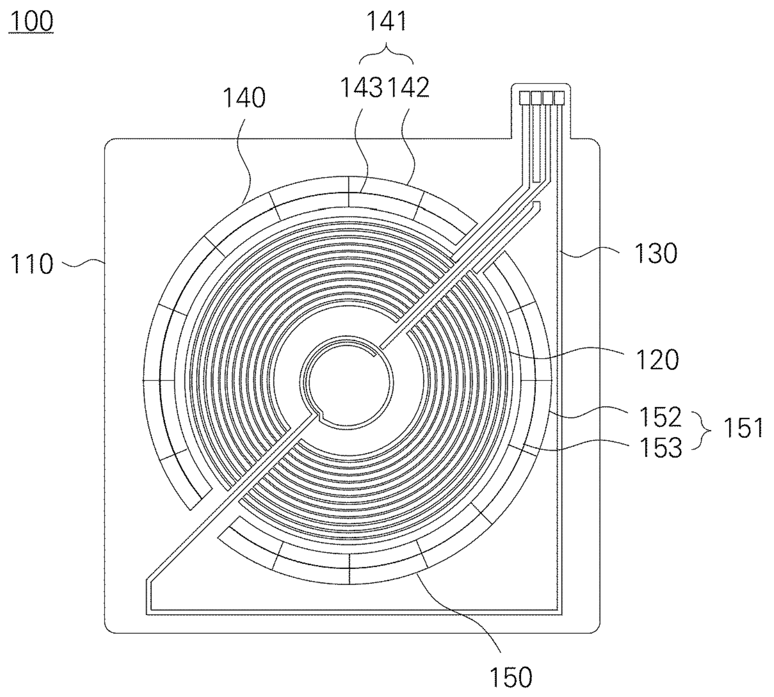
[FIG. 10]
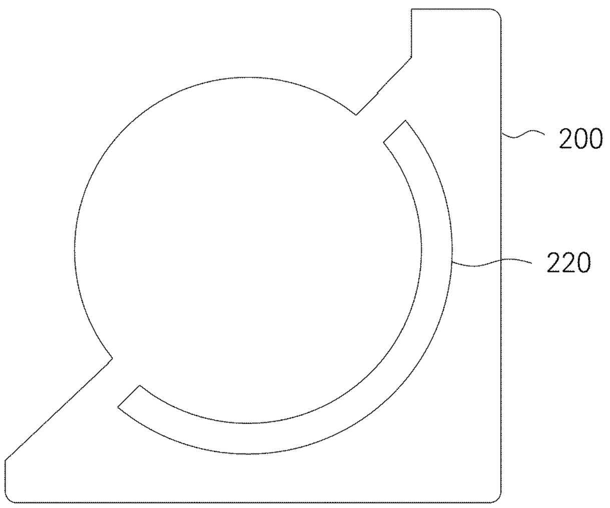

[FIG. 11]
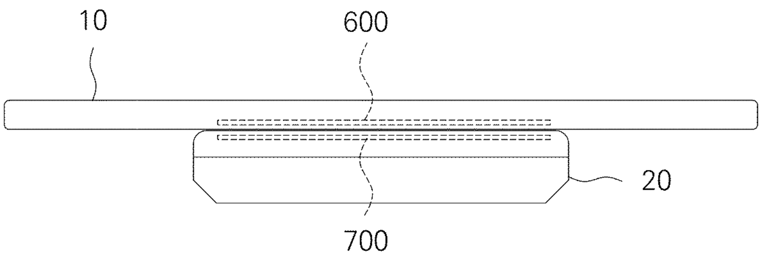
[FIG. 12]
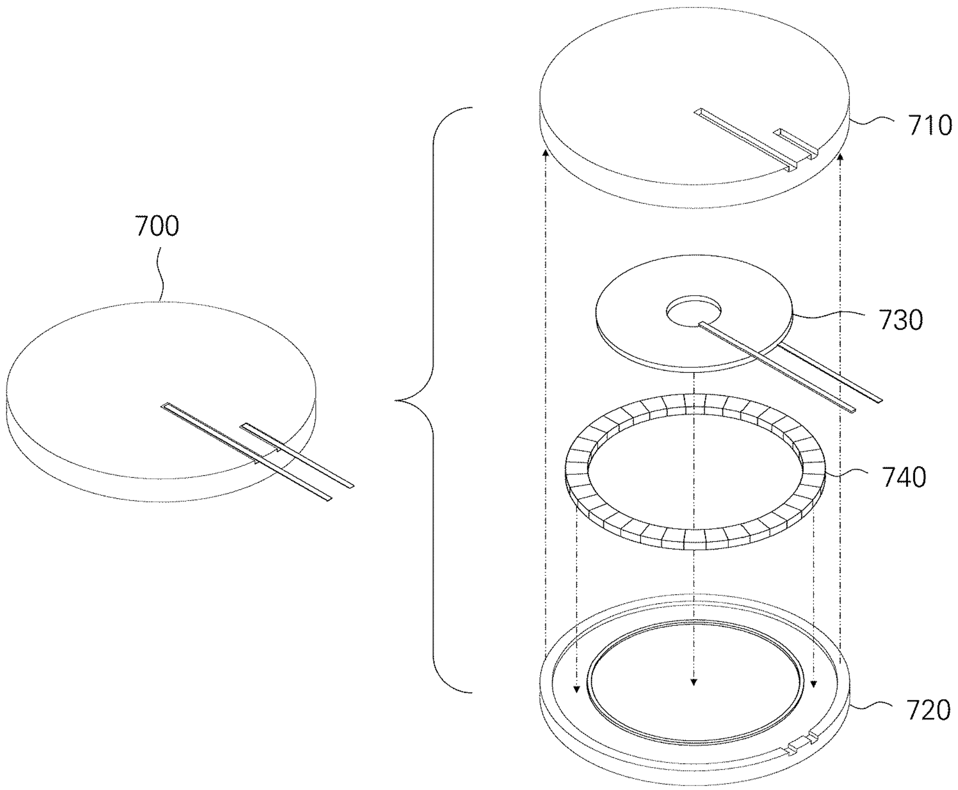

[FIG. 13]
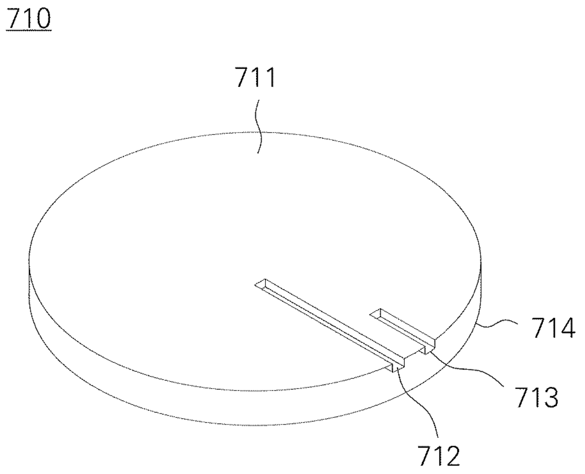
[FIG. 14]
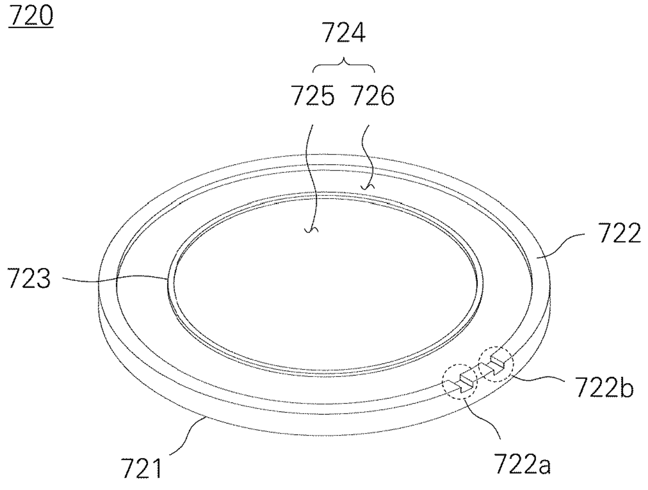

[FIG. 15]
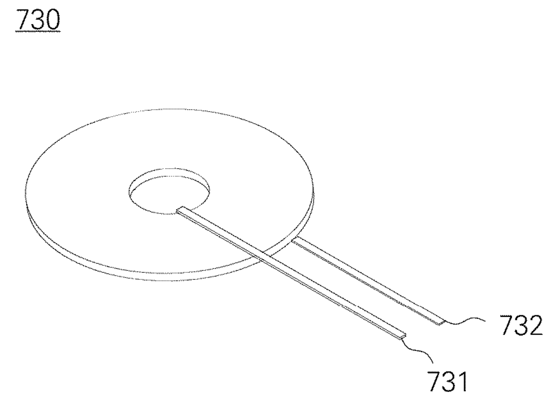
[FIG. 16]
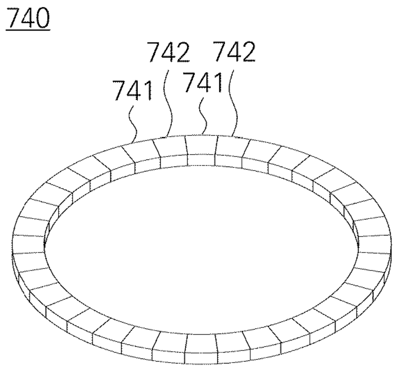
[FIG. 17]
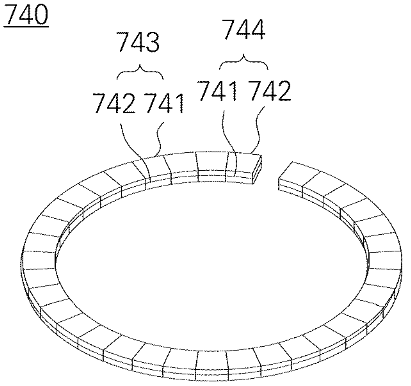

[FIG. 18]
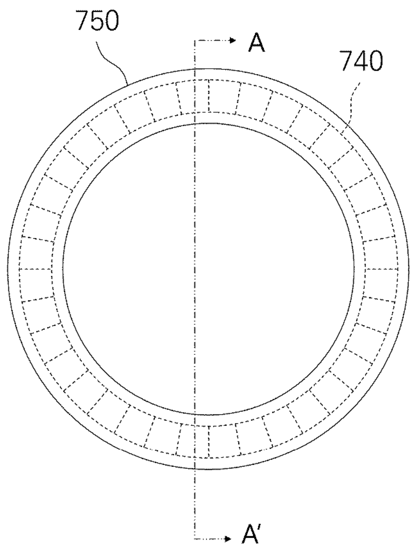
[FIG. 19]
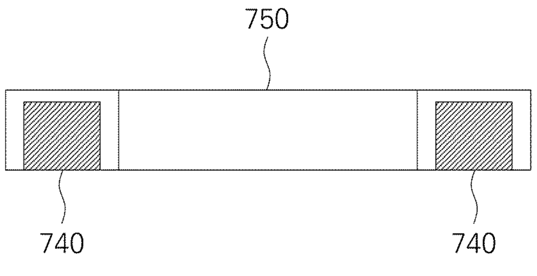

[FIG. 20]
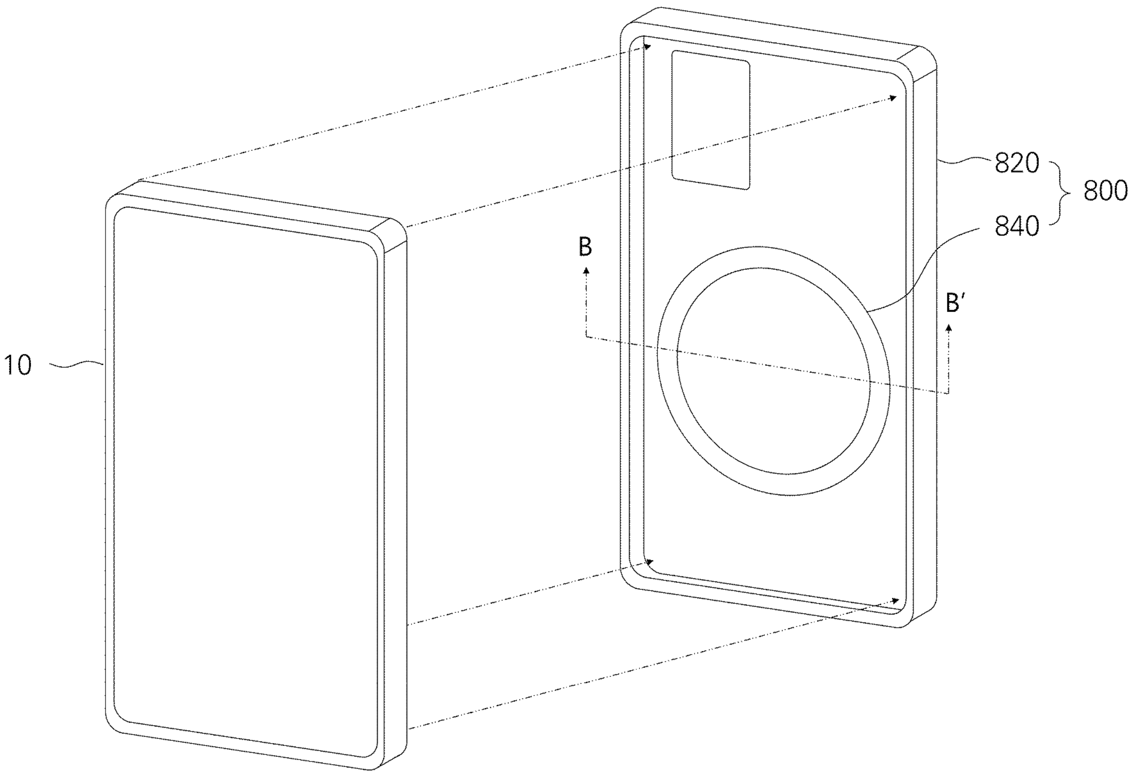
[FIG. 21]
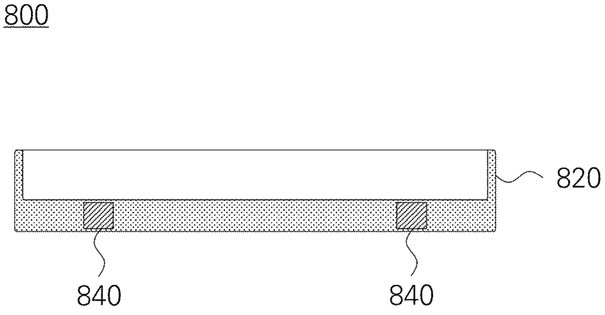

[FIG. 22]
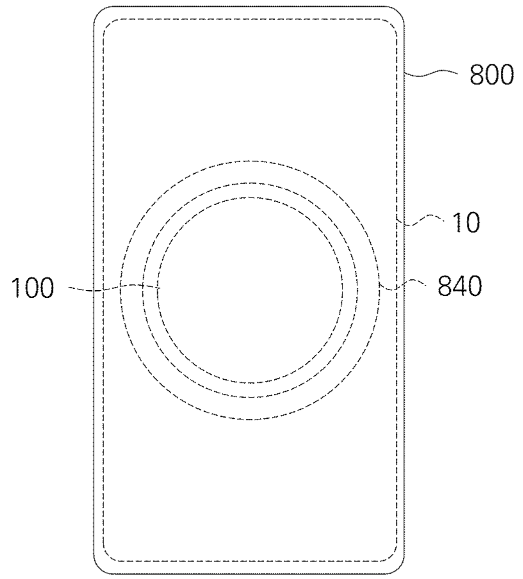
[FIG. 23]
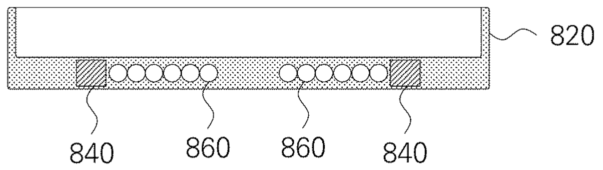

ANTENNA MODULE, WIRELESS POWER TRANSMISSION SYSTEM, AND CASE FOR PORTABLE TERMINAL

TECHNICAL FIELD

The present disclosure relates to an antenna module supporting wireless power transmission, a wireless power transmission system, and a case for a portable terminal.

BACKGROUND ART

A mobile terminal charges a built-in battery by using a charging cable, and is driven by a power charged in the battery. Recently, with the development of wireless power transmission technology, a method for wirelessly charging a battery by using the wireless power transmission technology has been applied to a portable terminal.

Wireless charging is a charging method for wirelessly transmitting a power through coil-type antennas built in a transmission side (Tx, charger) and a reception side (Rx, portable terminal).

In case of slow charge, the wireless charging has specified charge efficiency even in a state where alignment of an antenna on the transmission side and an antenna on the reception side is not correct.

However, in case of fast charge, if the alignment of the antenna on the transmission side and the antenna on the reception side is not correct, the charge efficiency of the wireless charging is degraded, and during the charging, heat generation of the portable terminal and/or the charger becomes severe.

Accordingly, various researches have been made to correctly align the antenna of the portable terminal and the antenna of the charger when mounting the charger on the portable terminal.

The matters described in the above background technology are to help understanding of the background of the present disclosure, and may include the matters that are not the disclosed technology in the related art.

SUMMARY OF INVENTION

Technical Problem

The present disclosure has been proposed to solve the above-described problems, and an object of the present disclosure is to provide an antenna module, which can prevent a shielding sheet from being magnetically saturated (magnetized) by a magnet mounted on an antenna sheet by punching a partial area of an entire area of the shielding sheet, which overlaps the magnet.

Further, another object of the present disclosure is to provide a wireless power transmission system, which can make a reception antenna module disposed in a portable terminal through magnetic coupling and a transmission antenna module installed in a charger be aligned in accurate positions through magnetic coupling between magnetic bodies of the reception antenna module and the transmission antenna module.

Further, still another object of the present disclosure is to provide a case for a portable terminal, which can make a reception antenna module built in the portable terminal and a transmission antenna module be aligned in accurate positions through magnetic coupling between a magnetic body provided to be disposed along an outer periphery of the reception antenna module and a magnetic body of the transmission antenna module when the case is mounted on the portable terminal.

Solution to Problem

In order to achieve the above objects, a wireless power transmission system according to an embodiment of the present disclosure includes: a reception antenna module configured to receive a wireless power; and a transmission antenna module configured to transmit the wireless power, wherein the transmission antenna module includes: a first housing formed of a magnetic material; a second housing disposed at a lower part of the first housing, and disposed to face the reception antenna module; a transmission coil interposed between the first housing and the second housing; and a transmission-side magnet array interposed between the first housing and the second housing and disposed along an outer periphery of the transmission coil.

In order to achieve the above objects, a case for a portable terminal according to an embodiment of the present disclosure includes: an outer housing; and a magnet array configured so that an S-pole magnet and an N-pole magnet are alternately disposed, and disposed in the outer housing.

Advantageous Effects of Invention

According to the present disclosure, the antenna module has the effect of being able to prevent the shielding sheet from being magnetically saturated (magnetized) by the magnet mounted on the antenna sheet by punching the partial area of the entire area of the shielding sheet, which overlaps the magnet.

Further, the antenna module has the effect of being able to prevent the shielding performance of the shielding sheet from being degraded by punching the partial area of the entire area of the shielding sheet, which overlaps the magnet mounted on the antenna sheet.

Further, the antenna module has the effect of being able to prevent the characteristic of the antenna module, such as inductance or charge efficiency, from being degraded by preventing the shielding sheet from being magnetically saturated (magnetized) by the magnet mounted on the antenna sheet through punching of the partial area of the entire area of the shielding sheet, which overlaps the magnet.

Further, the wireless power transmission system has the effect of being able to minimize the decrease of the wireless power transmission efficiency of the transmission coil by aligning the transmission coil and the reception coil in the accurate positions and minimizing interference caused by the magnetism of the transmission-side magnet array, through disposition of a shielding material on an upper surface, an outer peripheral surface, and an inner peripheral surface of the transmission-side magnet array.

Further, the case for a portable terminal has the effect of being able to minimize the decrease of the wireless power transmission efficiency by aligning the transmission coil and the reception coil in the accurate positions even in case of using the portable terminal mounted with only the reception coil without the magnet array, through molding of the magnet array onto the outer housing.

BRIEF DESCRIPTION OF DRAWINGS

FIG. 1 is a view explaining an antenna module according to an embodiment of the present disclosure.

FIG. 2 is a top view explaining the antenna sheet of FIG. 1.

FIG. 3 is a bottom view explaining the antenna sheet of FIG. 2.

FIGS. 4 and 5 are views explaining a first magnet array and a second magnet array of FIG. 3.

FIG. 6 is a view explaining a magnetic sheet of FIG. 1.

FIG. 7 is a view explaining a laminated structure of an antenna module according to an embodiment of the present disclosure.

FIG. 8 is a view explaining a modified example of a laminated structure of an antenna module according to an embodiment of the present disclosure.

FIGS. 9 and 10 are views explaining a modified example of an antenna module according to an embodiment of the present disclosure.

FIG. 11 is a view explaining a wireless power transmission system according to an embodiment of the present disclosure.

FIG. 12 is a view explaining a transmission antenna module of FIG. 11.

FIG. 13 is a view explaining a first housing of FIG. 11.

FIG. 14 is a view explaining a second housing of FIG. 11.

FIG. 15 is a view explaining a transmission coil of FIG. 11.

FIGS. 16 and 17 are views explaining a transmission-side magnet array of FIG. 11.

FIG. 18 is a view explaining a modified example of a wireless power transmission system according to an embodiment of the present disclosure.

FIG. 19 is a cross-sectional view of a transmission-side magnet array of FIG. 18 being cut based on line A-A'.

FIGS. 20 and 21 are views explaining a case for a portable terminal according to an embodiment of the present disclosure.

FIG. 22 is a view explaining a magnet array of FIGS. 20 and 21.

FIG. 23 is a view explaining a modified example of a case for a portable terminal according to an embodiment of the present disclosure.

DESCRIPTION OF EMBODIMENTS

Hereinafter preferred embodiments of the present disclosure will be described in detail with reference to the accompanying drawing.

Embodiments are provided to describe the present disclosure more completely to those of ordinary skill in the art, and the following embodiments may be modified in various different forms, and thus the scope of the present disclosure is not limited to the following embodiments. Rather, these embodiments are provided to make the present disclosure more faithful and complete and to completely transfer the idea of the present disclosure.

The terms used in the description are used to describe specific embodiments, and are not intended to limit the present disclosure. Further, in the description, unless clearly indicated otherwise in context, a singular form may include a plural form.

In describing the embodiments, in case that each layer (film), area, pattern, or structure is described to be formed "on" or "under" each substrate, layer (film), area, pad, or pattern, the terms "on" and "under" include both "direct" or "indirect" forming. Further, the criterion of "on" or "under" each layer is principally based on the drawings.

The drawings are merely to understand the idea of the present disclosure, and it should not be interpreted that the scope of the present disclosure is not limited by the drawings. Further, in the drawings, a relative thickness, length, or size may be exaggerated for convenience and accuracy of the description.

Referring to FIG. 1, an antenna module according to an embodiment of the present disclosure is configured to include an antenna sheet 100 having a first surface and a second surface, and a shielding sheet 200 disposed on the second surface of the antenna sheet 100.

On the antenna sheet 100, a plurality of radiation patterns that resonate in different frequency bands are formed. As an example, on the antenna sheet 100, a first radiation pattern 120 for wireless power transmission and a second radiation pattern 130 for short range communication are formed. On the antenna sheet 100, a magnet that derives alignment of the antenna sheet 100 and a wireless charger is disposed. On the antenna sheet 100, a magnet in an annular arc shape is disposed along an outer periphery of the first radiation pattern 120.

Referring to FIGS. 2 and 3, the antenna sheet 100 includes a base sheet 110, a first radiation pattern 120, a second radiation pattern 130, a first magnet array 140, and a second magnet array 150.

The base sheet 110 is a plate type material having a first surface and a second surface. As an example, the base sheet 110 is a resin sheet formed of a material, such as polyimide.

The first radiation pattern 120 is a radiation pattern for wireless power transmission. The first radiation pattern 120 is composed of an upper radiation pattern 121 and a lower radiation pattern 122.

The upper radiation pattern 121 is formed on the first surface of the base sheet 110, and forms a first loop that is wound plural times on the first surface of the base sheet 110. In this case, the upper radiation pattern 121 forms an entry path R1 where the second radiation pattern 130 enters from an outside of the first loop into an inner periphery of the first loop and an exit path R2 where the second radiation pattern 130 exits from the inner periphery of the first loop to the outside of the first loop.

Here, the entry path R1 and the exit path R2 mean paths which the second radiation pattern 130 crosses in order to form an inner loop in an inner periphery area of the first loop. The entry path R1 and the exit path R2 are formed to extend from the inner periphery of the first loop toward an outer periphery direction and to cross the first radiation pattern 120. The entry path R1 and the exit path R2 are spaces where the first radiation pattern 120 is not formed in the first loop, and the first radiation pattern 120 is not disposed in the entry path R1 and the exit path R2.

The lower radiation pattern 122 is formed on the second surface of the base sheet 110, and forms a second loop that is wound plural times on the second surface of the base sheet 110. The lower radiation pattern 122 is connected to the upper radiation pattern 121 through a plurality of via-holes that penetrate the base sheet 110.

The outside diameters of the first loop of the upper radiation pattern 121 and the second loop of the lower radiation pattern 122 are about 380.

The second radiation pattern 130 is formed on the first surface of the base sheet 110. The second radiation pattern 130 enters the inner periphery of the first loop of the first radiation pattern 120 through the entry path R1, and forms an inner loop in an inner peripheral area of the first loop. After forming the inner loop, the second radiation pattern 130 exits to the outside of the first loop of the first radiation pattern 120 through the exit path R2. After exiting to the outside of the first loop, the second radiation pattern 130 forms a third loop by being wound plural times on the first surface of the base sheet 110.

On the base sheet 110, through-holes that are penetrated by the first magnet array 140 and the second magnet array 150 are formed. On the base sheet 110, a first through-hole that is penetrated by the first magnet array 140 and a second through-hole that is penetrated by the second magnet array 150 are formed. The first through-hole and the second through-hole are formed to be spaced apart over a predetermined interval from the outer periphery of the loop formed by the first radiation pattern 120. In this case, it is exemplified that the first through-hole and the second through-hole are spaced apart for about 1 mm from the outer periphery of the first radiation pattern 120.

The first magnet array 140 is configured so that a plurality of magnets are arranged in an annular arc shape. One end of the first magnet array 140 is disposed on the first surface and the second surface of the first base sheet 110 through penetration of the first through-hole of the base sheet 110. The first magnet array 140 is disposed along the outer periphery of the first radiation pattern 120, and includes a plurality of first magnet units 141 that form the annular arc shape. The first magnet unit 141 is configured to include an S-pole permanent magnet 142 disposed to be spaced apart from the outer periphery of the first radiation pattern 120, and an N-pole permanent magnet 143 disposed to be spaced apart from the outer periphery of the first radiation pattern 120, and disposed between the S-pole permanent magnet 142 and the outer periphery of the first radiation pattern 120.

The second magnet array 150 is configured so that a plurality of magnets are arranged in an annular arc shape. One end of the second magnet array 150 is disposed on the first surface and the second surface of the first base sheet 110 through penetration of the second through-hole of the base sheet 110. The second magnet array 150 is disposed along the outer periphery of the first radiation pattern 120, and includes a plurality of second magnet units 151 that form the annular arc shape. The second magnet unit 151 is configured to include an S-pole permanent magnet 152 disposed to be spaced apart from the outer periphery of the first radiation pattern 120, and an N-pole permanent magnet 153 disposed to be spaced apart from the outer periphery of the first radiation pattern 120, and disposed between the S-pole permanent magnet 152 and the outer periphery of the first radiation pattern 120.

The first magnet array 140 is disposed counterclockwise along the outer periphery of the first radiation pattern 120 from a position adjacent to the entry path R1 of the first radiation pattern 120 to a position adjacent to the exit path R2. The second magnet array 150 is disposed counterclockwise along the outer periphery of the first radiation pattern 120 from the position adjacent to the exit path R2 of the first radiation pattern 120 to the position adjacent to the entry path R1. In this case, both ends of the first magnet array 140 and the second magnet array 150 are disposed to face each other, are spaced apart from each other, and form the entry path R1 and the exit path R2 of the second radiation pattern 130.

Referring to FIG. 4, the first magnet array 140 and the second magnet array 150 form an annular shape in which N-pole permanent magnets 143 and 153 are disposed on the inside of the first magnet array 140 and the second magnet array 150, and S-pole permanent magnets 142 and 152 are disposed on the outside thereof. In this case, the N-pole permanent magnets 143 and 153 and the S-pole permanent magnets 142 and 152 that constitute the first magnet array 140 and the second magnet array 150 are formed in an arc shape having an angle of about 20 degrees. The inner periphery diameter d1 of the annular arc shape formed by the first magnet array 140 and the second magnet array 150 is about 38 mm, and the outer periphery diameter d2 of the annular shape is about 46 mm.

The width of the S-pole permanent magnets 142 and 152 and the N-pole permanent magnets 143 and 153 that constitute the first electrode unit and the second electrode unit is about 3 mm, and the thickness thereof is about 300 μm to 400 μm.

Referring to FIG. 5, the first magnet array 140 and the second magnet array 150 may be replaced by an integrally formed reception-side magnet array 160. The reception-side magnet array 160 is configured so that an S-pole permanent magnet 162 and an N-pole permanent magnet 164 are alternately disposed. In this case, the reception-side magnet array 160 may be formed to have a path being penetrated by other structures through opening of at least a part of the reception-side magnet array 160.

The shielding sheet 200 is a plate type material formed of a magnetic material having a first surface and a second surface, and is laminated on the second surface of the base sheet 110.

In case that the shielding sheet 200 overlaps the first magnet array 140 and the second magnet array 150, it may be magnetically saturated (magnetized) by magnetism that is generated from the N-pole permanent magnets 143 and 153 and the S-pole permanent magnets 142 and 152, and due to this, the shielding performance may be degraded, or the antenna characteristic, such as inductance or charging efficiency, may be changed.

Accordingly, the antenna module according to an embodiment of the present disclosure can prevent the degrading of the shielding performance and the characteristic deterioration of the antenna module, such as inductance or charge efficiency, by preventing the shielding sheet 200 from being magnetically saturated (magnetized) by the magnet mounted on the base sheet 110 through punching of the partial area of the entire area of the shielding sheet 200, which overlaps the magnet.

That is, referring to FIG. 6, anti-overlap holes are formed on an area of the shielding sheet 200 that overlaps the first magnet array 140 and the second magnet array 150 of the base sheet 110. That is, the anti-overlap holes are formed by removing (punching) the area, which overlaps the first magnet array 140 and the second magnet array 150, of the entire area of the shielding sheet 200.

On the shielding sheet 200, a first anti-overlap hole 210 corresponding to the first magnet array 140 and a second anti-overlap hole 220 corresponding to the second magnet array 150 are formed. The first anti-overlap hole 210 may overlap the first through-hole formed on the base sheet 110, and the second anti-overlap hole 220 may overlap the second through-hole formed on the base sheet 110.

Meanwhile, the antenna module may further include a protection sheet 300 laminated on the first surface of the base sheet 110, and a thermal spread sheet 400 laminated on the second surface of the shielding sheet 200. It is possible to properly select the thickness of the first radiation pattern 120 and the thickness (or the number of layers) of the shielding sheet 200 depending on the thicknesses of the first magnet array 140 and the second magnet array 150.

Referring to FIG. 7, the first magnet array 140 and the second magnet array 150 are accommodated in the anti-overlap holes. That is, a part of the first magnet array 140 is accommodated in the first through-hole of the base sheet 110, and the other part (end part of the first magnet array 140 having penetrated the first through-hole) thereof is accommodated in the first anti-overlap hole 210 of the shielding sheet 200. A part of the second magnet array 150 is accommodated in the second through-hole of the base sheet 110, and the other part (end part of the second magnet array 150 having penetrated the second through-hole) thereof is accommodated in the second anti-overlap hole 220 of the shielding sheet 200.

Referring to FIG. 8, the first anti-overlap hole 210 and the second anti-overlap hole 220 may form openings 500*a* and 500*b* between the first magnet array 140 and the second magnet array 150 and the thermal spread sheet 400. That is, the first opening 500*a* is formed between the end part of the first magnet array 140, the first anti-overlap hole 210, and the thermal spread sheet 400, and the second opening 500*b* is formed between the end part of the second magnet array 150, the second anti-overlap hole 220, and the thermal spread sheet 400.

Referring to FIGS. 9 and 10, an area 51 where the second radiation pattern 130 is not formed may exist on the base sheet 110 depending on the characteristic required for the base sheet 110. That is, the second radiation pattern 130 may be formed adjacent to only the inner periphery area of the first radiation pattern 120 and two adjacent sides of the base sheet 110. In this case, the area that overlapping the area where the second radiation pattern 130 is not formed may be partially removed from the shielding sheet 200.

Referring to FIG. 11, a wireless power transmission system according to an embodiment of the present disclosure is configured to include a reception antenna module 600 installed in a portable terminal 60, and a transmission antenna module 700 installed in a charger.

The reception antenna module 600 is the same as the antenna module described with reference to FIGS. 1 to 10, and thus the detailed description thereof will be omitted. In this case, the reception antenna module 600 may be configured not to include a second radiation pattern, but to include only a first radiation pattern.

The transmission antenna module 700 is an antenna module that wirelessly transmits the power for charging the portable terminal 60. The transmission antenna module 700 is installed in the charger, and when the portable terminal 60 is disposed on the charger, it is installed to be disposed close to and to face the reception antenna module 600.

Referring to FIG. 12, the transmission antenna module 700 is configured to include a first housing 710, a second housing 720, a transmission coil 730, and a transmission-side magnet array 740.

The first housing 710 is a material positioned at a top part in the drawing. The first housing 710 is a shielding material that shields a magnetic field being generated during wireless charging. The first housing 710 is composed of a magnetic body, and as an example, it is a magnetic body formed of a material, such as ferrite, polymer, amorphous ribbon, or nano-crystalline.

The first housing 710 may be a magnetic body composed of an amorphous ribbon. As an example, the amorphous ribbon is a magnetic body including Fe, Si, and B, or a magnetic body including Fe, Si, and Nb. The amorphous ribbon may be a magnetic body including Fe, Si, B, Cu, and Nb. The first housing 710 may be a magnetic body composed of nano-crystalline including a nano-crystalline alloy.

The first housing 710 may be composed of a magnetic body, such as ferrite or polymer. The first housing 710 may be composed of a magnetic body in which homogeneous or heterogeneous magnetic components are mixed.

Referring to FIG. 13, the first housing 710 may be configured to include a first horizontal plate 711 and a first vertical plate 714.

The first horizontal plate 711 is a plate type plate formed in a circular shape. On the first horizontal plate 711, a pair of slits for discharging both ends of the transmission coil 730 accommodated in a first accommodation space to an outside may be formed.

That is, on the first horizontal plate 711, a first slit 712 for discharging a first end part 731 of the transmission coil 730 to the outside and a second slit 713 for discharging a second end part 732 of the transmission coil 730 to the outside are formed.

In this case, the second slit 713 is formed spaced apart from the first slit 712 with a shorter length than the length of the first slit 712. In other words, the length of the second slit 713 is formed to be shorter than the length of the first slit 712. Here, the lengths of the first slit 712 and the second slit 713 may be the lengths from the end part adjacent to the center point of the first horizontal plate 711 to the end part disposed on the outer periphery of the first horizontal plate 711.

In the first slit 712, a part of the transmission coil 730, adjacent to the first end part 731 is accommodated, and in the second slit 713, a part of the transmission coil 730, adjacent to the second end part 732 is accommodated.

The first vertical plate 714 is disposed along the outer periphery of the first horizontal plate 711, and extends toward the lower part of the first vertical plate 714 to form a side surface of the first housing 710. In this case, in the first housing 710, a first accommodation space surrounded by the lower surface of the first horizontal plate 711 and the first vertical plate 714 is formed, and in the first accommodation space, the second housing 720, the transmission coil 730, and the transmission-side magnet array 740 are accommodated.

The second housing 720 is combined with the first housing 710. As an example, the second housing 720 is combined with the first housing 710 so that the second housing 720 is accommodated in the first accommodation space of the first housing 710. The second housing 720 is disposed to face the wireless power reception module when being mounted in the charger.

The second housing 720 is formed of a material, such as a resin material or a metal material, capable of passing a magnetic field that is generated during the wireless charging therethrough.

Referring to FIG. 14, the second housing 720 may be configured to include a second horizontal plate 721, a second vertical plate 722, and a third vertical plate 723.

The second horizontal plate 721 is a plate type material formed in a circular shape.

The second vertical plate 722 is disposed along an outer periphery of the second horizontal plate 721, and extends toward an upper part of the second vertical plate 722 to form a side surface of the second housing 720. In this case, in the second housing 720, a second accommodation space 724 surrounded by the upper surface of the second horizontal plate 721 and the second vertical plate 722 is formed.

On the second vertical plate 722, a pair of through-grooves being penetrated by both ends of the transmission coil 730 may be formed. That is, on the second vertical plate 722, a first through-groove 722*a* for discharging the first end part 731 of the transmission coil 730 to the outside and a second through-groove 722*b* for discharging the second end part 732 of the transmission coil 730 to the outside are formed. As the second housing 720 is accommodated in the first housing 710, the first through-groove 722*a* is disposed side by side with the first end part 731 of the first slit 712 formed on the first vertical plate 714. As the second housing 720 is accommodated in the first housing 710, the second through-groove 722*b* is disposed side by side with the first end part 731 of the second slit 713 formed on the first vertical plate 714.

The third vertical plate 723 forms an inner partition wall extending from the upper surface of the second horizontal plate 721 to the upper part of the second vertical plate 722, and partitioning the second accommodation space 724 into two accommodation spaces. In this case, the second accommodation space 724 is partitioned into an inner accommodation space 725 and an outer accommodation space 726 by the third vertical plate 723. The transmission coil 730 is accommodated in the inner accommodation space 725, and the transmission-side magnet array 740 is accommodated in the outer accommodation space 726.

The transmission coil 730 is a coil for wireless power transmission. Referring to FIG. 15, the transmission coil 730 is formed in a loop shape which is wound plural times on a virtual winding shaft that vertically penetrates the center point of the first housing 710 and the second housing 720. In other words, the transmission coil 730 may be composed of a plate type loop coil being wound plural times on the lower surface of the first housing 710 or being wound plural times on the upper surface of the second housing 720.

The transmission coil 730 is disposed in the inner accommodation space 725 of the second housing 720. The first end part 731 of the transmission coil 730 is exposed to the outside after passing through the first through-groove 722*a* of the second vertical plate 722 and the first slit 712 of the first horizontal plate 711. The second end part 732 of the transmission coil 730 is exposed to the outside after passing through the second through-groove 722*b* of the second vertical plate 722 and the second slit 713 of the first horizontal plate 711.

The transmission-side magnet array 740 is magnetically coupled to the magnet array 840 of the reception antenna module 600, and induces so that the transmission coil 730 and the reception coil 860 (i.e., first radiation pattern as described above) are aligned in accurate positions. Through this, the wireless power transmission system prevents the wireless power transmission efficiency of the transmission coil 730 and the reception coil 860 from being degraded.

Referring to FIG. 16, the transmission-side magnetic array 740 is configured so that a plurality of magnets are arranged in a circular or an arc shape. In this case, the transmission-side magnet array 740 is configured so that an S-pole permanent magnet 741 and an N-pole permanent magnet 742 are alternately disposed.

The transmission-side magnet array 740 is disposed in the outer accommodation space 726 of the second housing 720, and is disposed in the form of surrounding the outer periphery of the transmission coil 730 with the third vertical plate 723 of the second housing 720 interposed therebetween. In this case, the transmission-side magnet array 740 may be formed to have a path being penetrated by other structures through opening of at least a part of the transmission-side magnet array 740.

Referring to FIG. 17, the transmission-side magnet array 740 may be configured to include a third magnet array 840, and a fourth magnet array 840 disposed on a lower part of the third magnet array 840.

The third magnet array 840 is configured so that an S-pole permanent magnet 741 and an N-pole permanent magnet 742 are alternately arranged in an arc shape. The fourth magnet array 840 is configured so that an N-pole permanent magnet 742 and an S-pole permanent magnet 741 are alternately arranged in an arc shape.

As the fourth magnet array 840 is disposed on the lower part of the third magnet array 840, the transmission-side magnet array 740 is configured so that a first laminated magnet 743 having an upper part on which the S-pole permanent magnet 741 is disposed and a lower part on which the N-pole permanent magnet 742 is disposed, and a second laminated magnet 744 having an upper part on which the N-pole permanent magnet 742 is disposed and a lower part on which the S-pole permanent magnet 741 is disposed are alternately arranged in an arc shape.

Referring to FIGS. 18 and 19, the transmission antenna module 700 may further include a shielding material 750 for shielding the transmission-side magnet array 740 from the surroundings.

The shielding material 750 is disposed along an upper surface, an outer peripheral surface, and an inner peripheral surface of the transmission-side magnet array 740. Accordingly, the lower surface of the transmission-side magnet array 740 is exposed to face the reception-side magnet array 840, and the upper surface, the outer peripheral surface, and the inner peripheral surface of the transmission-side magnet array 740 are shielded by the shielding material 750. Through this, the transmission antenna module 700 can minimize the decrease of the wireless power transmission efficiency of the transmission coil 730 by minimizing the interference caused by the magnetism of the transmission-side magnet array 740.

Referring to FIGS. 20 and 21, a case 800 for a portable terminal according to an embodiment of the present disclosure is an outer case that is inserted into the rear surface of the portable terminal 60, and is configured to include: an outer housing 820 fitted into the portable terminal 60; and a magnet array 840 molded onto the outer housing 820.

As an example, the outer housing 820 is mainly formed of a resin material. The outer housing 820 is formed of a resin material, such as polyurethane (PU) or thermoplastic polyurethane (TPU).

The outer housing 820 is composed of a first plate disposed on the rear surface of the portable terminal 60, and a second plate disposed along the side surface of the portable terminal 60. In this case, by the first plate and the second plate, an accommodation space for accommodating the portable terminal 60 is formed.

Referring to FIGS. 22 and 23, the magnet array 840 is molded onto the outer housing 820. The magnet array 840 is configured so that the S-pole permanent magnet and the N-pole permanent magnet are alternately disposed in a circular or an arc shape. The magnet array 840 is molded onto the first plate of the outer housing 820.

As the case 800 for the portable terminal is fitted into the rear surface of the portable terminal 60, the magnet array 840 is disposed on the rear surface of the portable terminal 60. In this case, the magnet array 840 is disposed along the outer periphery of the reception antenna module 600 built in the portable terminal 60.

The magnet array 840 may be configured so that laminated magnets where the S-pole permanent magnet and the N-pole permanent magnet are laminated are alternately disposed in the circular or arc shape. In this case, the magnet array 840 is configured so that a first laminated magnet having an upper part on which the S-pole permanent magnet is disposed and a lower part on which the N-pole permanent magnet is disposed, and a second laminated magnet having an upper part on which the N-pole permanent magnet is disposed and a lower part on which the S-pole permanent magnet is disposed are alternately arranged in an arc shape.

Referring to FIG. 23, the case 800 for the portable terminal may further include the reception coil 860. That is, the case 800 for the portable terminal is fitted into the portable terminal 60 having a built-in antenna for the wireless power reception. The case 800 for the portable terminal may be configured to apply the power received through the reception coil 860 to the portable terminal 60, and the portable terminal 60 may be configured to charge the built-in battery with the power received through the reception coil 860 of the case 800 for the portable terminal. In this case, a shielding material (not illustrated) may be further disposed between the magnet array 840 and the reception coil 860, and may minimize the decrease of the wireless power transmission efficiency of the reception coil 860 by minimizing the interference caused by the magnetism of the magnet array 840.

The above explanation of the present disclosure is merely for exemplary explanation of the technical idea of the present disclosure, and it can be understood by those of ordinary skill in the art to which the present disclosure pertains that various corrections and modifications thereof will be possible in a range that does not deviate from the essential characteristics of the present disclosure. Accordingly, it should be understood that the embodiments disclosed in the present disclosure are not to limit the technical idea of the present disclosure, but to explain the same, and thus the scope of the technical idea of the present disclosure is not limited by such embodiments. The scope of the present disclosure should be interpreted by the appended claims to be described later, and all technical ideas in the equivalent range should be interpreted as being included in the scope of the present disclosure.

The invention claimed is:

1. A wireless power transmission system comprising:
- a reception antenna module configured to receive a wireless power; and
- a transmission antenna module configured to transmit the wireless power,
- wherein the transmission antenna module includes:
- a first housing formed of a magnetic material;
- a second housing disposed at a lower part of the first housing, and disposed to face the reception antenna module;
- a transmission coil interposed between the first housing and the second housing; and
- a transmission-side magnet array interposed between the first housing and the second housing, and disposed along an outer periphery of the transmission coil,
- wherein the reception antenna module comprises:
- an antenna sheet having a radiation pattern formed thereon and having a magnet array, formed along an outer periphery of the radiation pattern, inserted therein; and
- a shielding sheet laminated on the antenna sheet, and having an anti-overlap hole formed in an area overlapping the magnet array,
- wherein the antenna sheet comprises:
- a base sheet having a first through-hole and a second through-hole formed thereon;
- a first radiation pattern formed on the base sheet, and formed in a loop shape having an entry path and an exit path;
- a second radiation pattern formed on the base sheet, configured to form an inner loop by entering an inner periphery area of the first radiation pattern through the entry path, and disposed outside the first radiation pattern through the exit path;
- a first magnet array configured to penetrate the first through-hole, and disposed along an outer periphery of the first radiation pattern; and
- a second magnet array configured to be spaced apart from the first magnet array and to penetrate the second through-hole, and disposed along the outer periphery of the first radiation pattern.

2. The wireless power transmission system of claim 1, wherein the first housing comprises:
- a first horizontal plate of a magnetic material; and
- a first vertical plate formed of a magnetic material, and disposed along an outer periphery of the first horizontal plate,
- wherein the first horizontal plate includes:
- a first slit formed thereon, and configured to discharge a first end part of the transmission coil; and
- a second slit formed thereon to be spaced apart from the first slit and to be shorter than the first slit, and configured to discharge a second end part of the transmission coil.

3. The wireless power transmission system of claim 1, wherein the second housing comprises:
- a second horizontal plate;
- a second vertical plate disposed along an outer periphery of the second horizontal plate; and
- a third vertical plate formed on a first surface of the second horizontal plate, and configured to partition an accommodation space defined by the second horizontal plate and the second vertical plate into an inner accommodation space and an outer accommodation space,
- wherein the inner accommodation space is a space defined by an inner periphery of the third vertical plate and the first surface of the second horizontal plate, and
- wherein the outer accommodation space is a space defined by an inner periphery of the second horizontal plate, an outer periphery of the third vertical plate, and the first surface of the second horizontal plate.

4. The wireless power transmission system of claim 3, wherein the second vertical plate comprises:
- a first through-groove disposed side by side with a first end part of a first slit of the first housing, and configured to discharge a first end part of the transmission coil; and
- a second through-groove spaced apart from the first through-groove, disposed side by side with a first end part of a second slit of the first housing, and configured to discharge a second end part of the transmission coil.

5. The wireless power transmission system of claim 3, wherein the transmission coil is disposed in the inner accommodation space, and
- wherein the transmission-side magnet array is disposed in the outer accommodation space.

6. The wireless power transmission system of claim 1, wherein the transmission-side magnet array comprises an S-pole magnet and an N-pole magnet alternately disposed.

7. The wireless power transmission system of claim 1, wherein the transmission-side magnet array comprises:
- a first laminated magnet where an S-pole magnet is disposed on an upper part of an N-pole magnet; and
- a second laminated magnet where an N-pole magnet is disposed on an upper part of an S-pole magnet,
- wherein the first laminated magnet and the second laminated magnet are alternately disposed.

8. The wireless power transmission system of claim 1, wherein the transmission antenna module further comprises a shielding material disposed along an upper surface, an outer peripheral surface, and an inner peripheral surface of the transmission-side magnet array, and configured to expose a lower surface of the transmission-side magnet array facing a magnet array of the reception antenna module.

9. The wireless power transmission system of claim 1, wherein the magnet array comprises a plurality of magnet units arranged in an annular arc shape along the outer periphery of the radiation pattern, and wherein the magnet unit includes:

an S-pole permanent magnet disposed spaced apart from the outer periphery of the radiation pattern; and an N-pole permanent magnet disposed between the outer periphery of the radiation pattern and the S-pole permanent magnet.

10. The wireless power transmission system of claim 1, wherein the first radiation pattern comprises:

an upper radiation pattern formed on a first surface of the base sheet; and a lower radiation pattern formed on a second surface of the base sheet, and connected to the upper radiation pattern through a via-hole penetrating the base sheet, wherein the upper radiation pattern is formed in a loop shape having the entry path and the exit path.

11. The wireless power transmission system of claim 1, wherein the first magnet array and the second magnet array are disposed so that both ends thereof face each other, are spaced apart from each other, and are configured to form an entry path and an exit path of the second radiation pattern.

12. The wireless power transmission system of claim 1, wherein the shielding sheet includes:

a first anti-overlap hole formed in an area of the shielding sheet, overlapping the first magnet array; and a second anti-overlap hole formed in an area of the shielding sheet, overlapping the second magnet array.

13. The wireless power transmission system of claim 12, wherein the first magnet array is accommodated in the first anti-overlap hole through penetration of the antenna sheet, and the second magnet array is accommodated in the second anti-overlap hole through penetration of the antenna sheet.

14. The wireless power transmission system of claim 12, further comprising a thermal spread sheet laminated on the shielding sheet, wherein the first anti-overlap hole is configured to form a first opening between the first magnet array and the thermal spread sheet, and wherein the second anti-overlap hole is configured to form a second opening between the second magnet array and the thermal spread sheet.

* * * * *